(12) United States Patent
Wray

(10) Patent No.: US 8,100,449 B2
(45) Date of Patent: Jan. 24, 2012

(54) CHAIN GRAB HOOK WITH ROTATABLE SPRING-LOADED LOCK BALL AND SNAP-ON NODULE

(76) Inventor: Christopher T. Wray, Camarillo, CA (US)

(*) Notice: Subject to any disclaimer, the term of this patent is extended or adjusted under 35 U.S.C. 154(b) by 0 days.

(21) Appl. No.: 13/046,906

(22) Filed: Mar. 14, 2011

(65) Prior Publication Data

US 2011/0221216 A1 Sep. 15, 2011

Related U.S. Application Data

(60) Provisional application No. 61/314,010, filed on Mar. 15, 2010.

(51) Int. Cl.
*B66C 1/36* (2006.01)
*B66C 1/34* (2006.01)
(52) U.S. Cl. ............... 294/82.23; 294/82.17; 24/600.8
(58) Field of Classification Search .............. 294/82.1, 294/82.21, 82.23, 82.17, 82.19; 24/599.1, 24/599.2, 116 R, 600.8, 601.5
See application file for complete search history.

(56) References Cited

U.S. PATENT DOCUMENTS

| 1,299,018 | A | * | 4/1919 | Pearson | 294/82.17 |
|---|---|---|---|---|---|
| 1,956,786 | A | * | 5/1934 | Bemis | 294/82.21 |
| 2,493,282 | A | * | 1/1950 | Criswell | 294/82.22 |
| 3,132,396 | A | * | 5/1964 | Berman | 24/27 |
| 3,899,806 | A | * | 8/1975 | Berg | 294/82.19 |
| 4,073,042 | A | * | 2/1978 | Miller | 294/82.19 |
| 4,363,509 | A | * | 12/1982 | Schreyer | 294/82.1 |
| 5,362,117 | A | * | 11/1994 | Bennett, Jr. | 294/82.23 |
| 5,636,889 | A | * | 6/1997 | Bennett, Jr. | 294/82.23 |
| 5,851,040 | A | * | 12/1998 | Fredriksson | 294/82.11 |
| 2007/0126251 | A1 | | 6/2007 | Olson et al. | 294/82.17 |
| 2009/0079213 | A1 | | 3/2009 | Robins | 294/82.22 |

FOREIGN PATENT DOCUMENTS

GB 2021678 A 12/1979

OTHER PUBLICATIONS

Unknown. "PowerPin Inc. Introduces Agricultural Safety Chains With The Snap-On Grab Hook." *PowerPin Inc.* Mar. 2006. <http://www.powerpin.ca/powerpin>.

* cited by examiner

*Primary Examiner* — Paul T Chin

(57) ABSTRACT

A chain grab hook for use with one hand, having a spring-loaded rotatable lock ball protruding from the shank of the hook, the lock ball movable along an axis aligned with the apex of a nodule on the tip portion of the hook, the nodule defining entrance and exit ramped slopes presenting a chain disengagement force exceeding a chain engagement force.

19 Claims, 5 Drawing Sheets

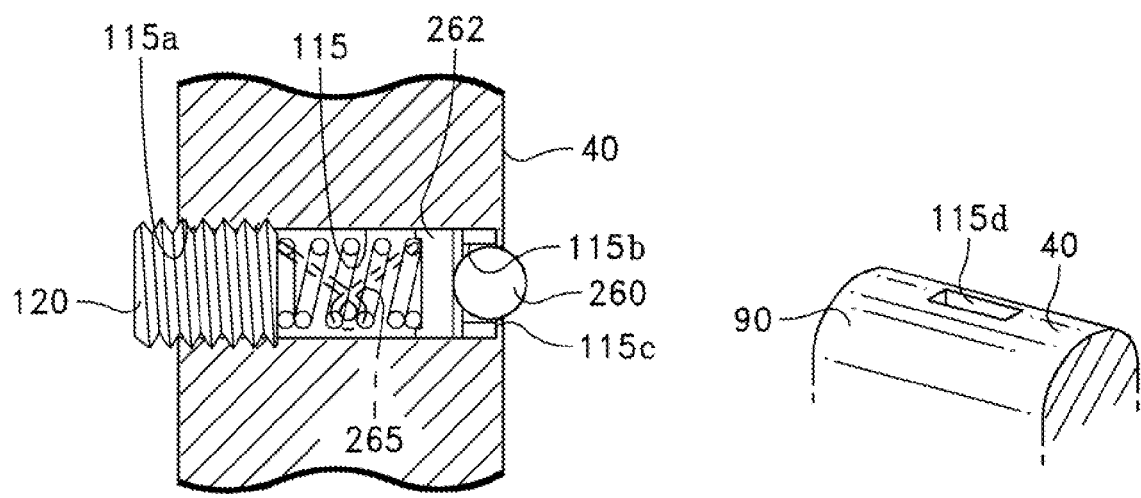
FIG. 12
FIG. 13
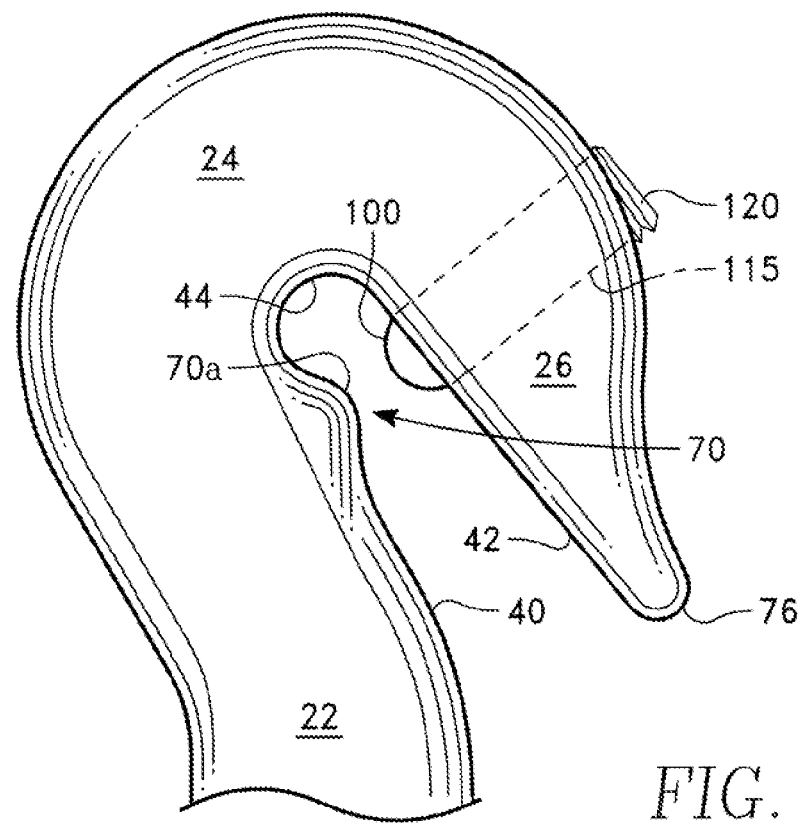
FIG. 14

CHAIN GRAB HOOK WITH ROTATABLE SPRING-LOADED LOCK BALL AND SNAP-ON NODULE

CROSS-REFERENCE TO RELATED APPLICATIONS

This application claims the benefit of U.S. Provisional Application Ser. No. 61/314,010, filed Mar. 15, 2010 entitled CHAIN GRAB HOOK WITH ROTATABLE SPRING-LOADED LOCK BALL AND SNAP-ON NODULE, by Christopher T. Wray.

BACKGROUND

Chain grab hooks are conventionally employed to couple a length of chain to another object, or to loop the chain around another object. The chain grab hook has a throat slightly larger than the thickness of a single chain link and a length of about the width of a single chain link. One link of chain is captured in the grab hook throat while being oriented parallel to the throat, while the two neighboring links of the chain on either side of the captured link are transverse to the throat and therefore cannot slide through the hook along the direction of the length of the chain. Such chain grab hooks are particularly useful in heavy equipment applications, where the operator holds the grab hook in one hand while holding either one portion of the chain or an object to be coupled with the other hand, and strikes the hook at a particular link in the chain to instantly fasten the chain to the grab hook. In many cases, one end of the chain is fastened to a clevis provided on an end of the grab hook opposite the throat, enabling the chain to be quickly formed in a loop. Typically, another end of the chain, not fastened to the clevis, is fastened to one heavy object (e.g., a chain hitch of a tractor) and the loop formed in the chain with the grab hook is wrapped around another object to be pulled, for example.

Provided the chain is kept under tension, the captured chain link will not slide out of the chain grab hook throat through the opening in the throat. However, it is not always possible to maintain constant tension on the chain after engagement of the grab hook with one link. Therefore the chain link can slip out of the opening of the grab hook throat during a brief interruption in the chain tension. In order to prevent chain slippage through the throat, a slidable locking pin may be placed across the throat opening. The locking pin may be spring-loaded and retractable, to permit a chain link to be engaged in the grab hook throat. The force of the link passing through the grab hook throat causes the spring-loaded locking pin to temporarily retract until one side of the link has passed the pin, after which the pin returns to the locking position.

One problem with such a locking pin is that the pin is elongate and must be held in an elongate interior hollow passageway of similar diameter and length extending through the body of the grab hook, so that the pin is liable to bind inside the hollow passageway. Such binding may be caused by either a slight deflection of the pin axis from the hollow passageway axis, or grit inside the hollow passageway. For this reason, a mechanism may be provided for manually controlling the position of the locking pin. However, using such a mechanism requires the use of both hands in operating the grab hook.

Another problem is that the locking pin, while being depressed during chain link insertion into the hook, offer significant resistance to insertion and removal of the chain. The link retention force provided by the spring-loaded locking pin must be sufficient to resist unwanted escape of the captured chain link from the grab hook throat. The retention force with which the chain is held in the hook throat after insertion is the same as the force required to insert it, so that insertion must be as difficult as withdrawal, a significant disadvantage. These factors typically make it difficult to use the chain hook unless the user employs both hands to engage the chain in the hook mouth.

What is desired is a chain hook in which the chain can be so easily inserted into the hook mouth that it requires only one hand to quickly and easily insert a chain link into the hook mouth, but yet holds the inserted chain in the hook mouth with a greater force that that required for insertion, and offers no unnecessary friction while inserting the chain, and whose locking device is not liable to binding.

SUMMARY

A chain grab hook has a hook body, a shank at one end of the hook body, a curved saddle having a first end extending from the shank and a tip portion extending from an opposite end of the curved saddle, the shank and the tip portion generally facing one another and defining between them a throat. The chain grab hook further includes a hollow cylindrical passage within the shank and extending toward the tip portion, the passage comprising a large diameter portion extending through the shank from an outer surface of the shank and a small diameter portion extending from the large diameter portion to an interior surface of the shank facing the tip portion, and a shoulder at a boundary between the large and small diameter portions. A ball within the passage has a diameter that is: (a) less than a diameter of the large diameter portion of the passage and (b) greater than a diameter of the small diameter portion of the passage, and is confined by a plug in the large diameter portion at the outer surface. An elastically compressible member inside the large diameter portion is compressed between the plug and the ball, to a stop position at which the ball is biased against the small diameter portion of the passage for protrusion of a portion of the ball through the small diameter portion and beyond the interior surface. A fastening element such as a clevis may be provided at an opposite end of the hook body.

In accordance with one embodiment, the chain grab hook further includes an interior surface on the tip portion facing the interior surface of the shank and a nodule on the interior surface of the tip portion, the nodule extending partially into the throat. The nodule includes an apex raised above the interior surface of the tip portion and facing the ball and being in general alignment with a longitudinal axis of the hollow cylindrical passage in the shank, an entrance slope extending from the apex to a tip of the tip portion and providing a smooth transition from the apex to the tip portion interior surface, and an exit slope extending from the apex toward the curved saddle. The exit slope is steeper than the entrance slope by a selected factor controlling a difference between a chain engagement force and a chain disengagement force.

BRIEF DESCRIPTION OF THE DRAWINGS

So that the manner in which the exemplary embodiments of the present invention are attained and can be understood in detail, a more particular description of the invention, briefly summarized above, may be had by reference to the embodiments thereof which are illustrated in the appended drawings. It is to be appreciated that certain well known processes are not discussed herein in order to not obscure the invention.

FIG. 12 is a partial cross-sectional elevational view another modified embodiment in which the ball is replaced by a disk.

FIG. 13 is a perspective view of a portion of the embodiment of FIG. 12 depicting a narrow slot in which the disk is received.

FIG. 14 is an elevational view in which the embodiment of FIG. 1 is modified by exchanging the locations of the nodule with the passage holding the ball, spring and plug assembly.

Figure 1:
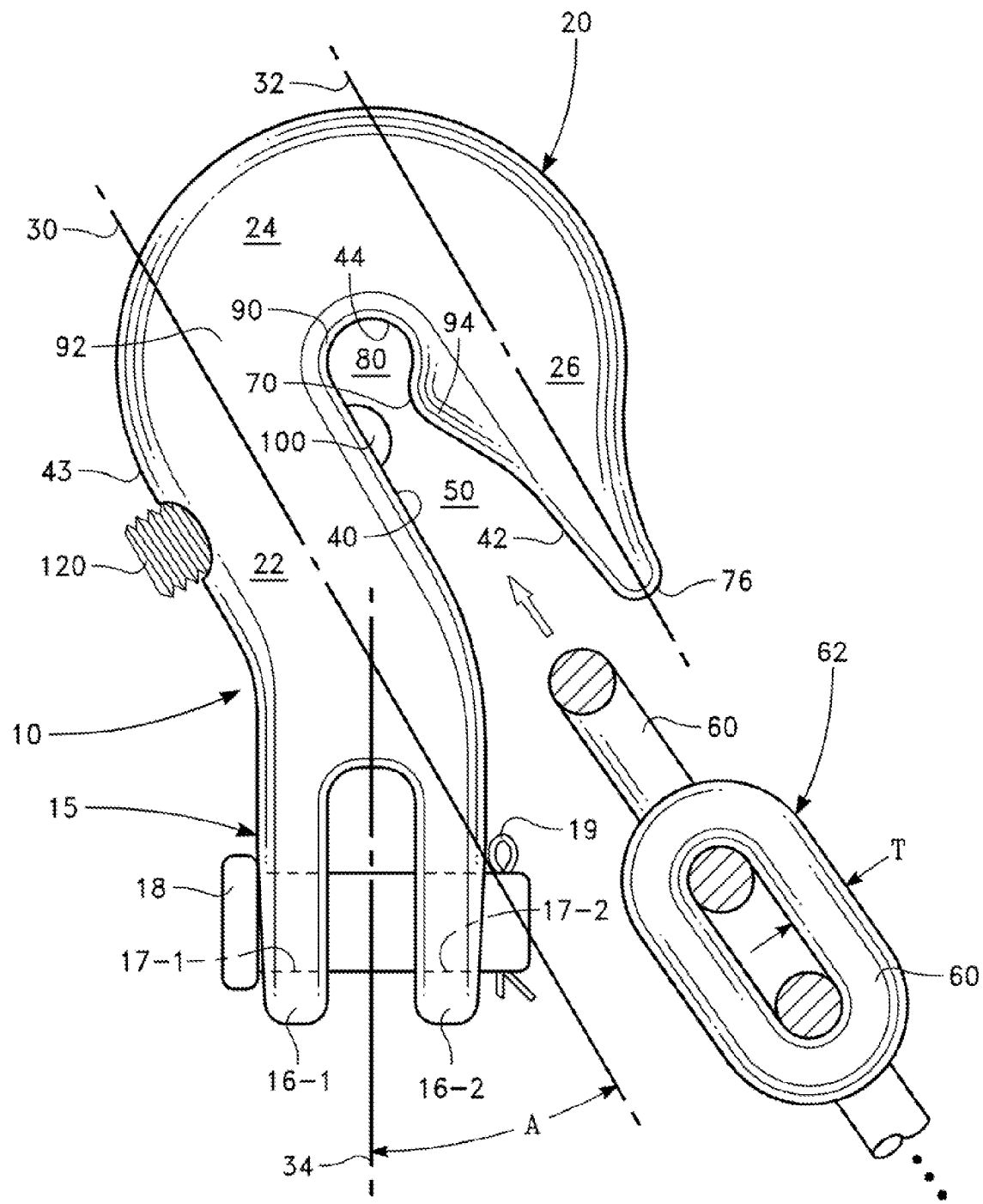
FIG. 1 is an elevational view of a chain grab hook in accordance with a first embodiment prior to engagement with a link of a chain.
Figure 2:
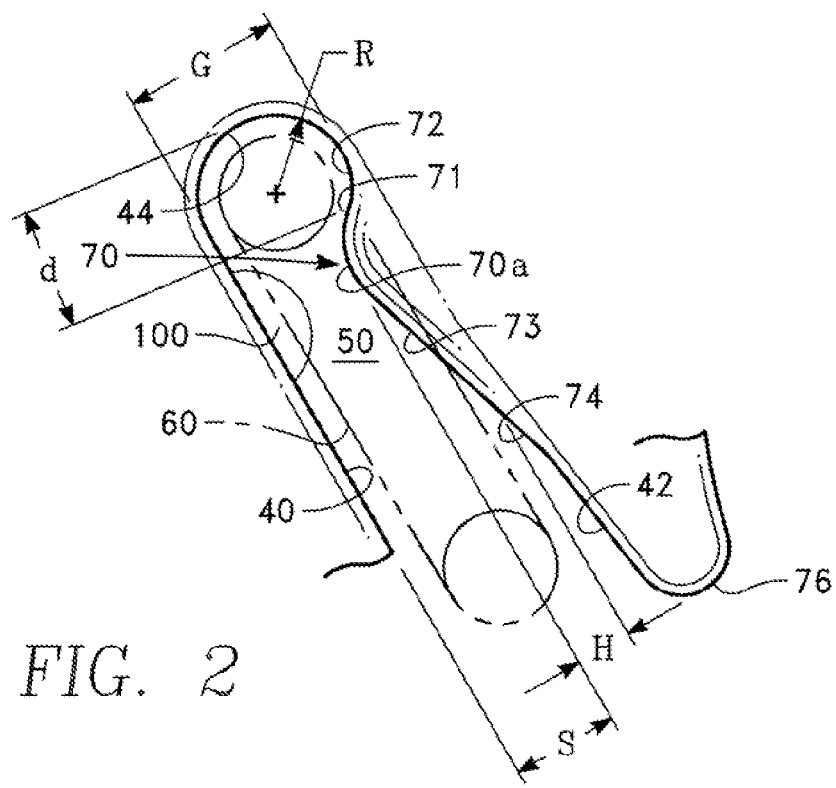
FIG. 2 is a partial view of the chain grab hook of FIG. 1 with a chain link engaged in the hook.
Figure 3:
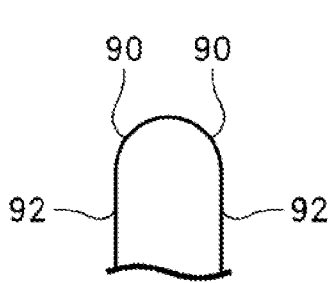
FIG. 3 is a side view of a portion of the embodiment of FIG. 1 showing a chamfer of a surface.
Figure 4:
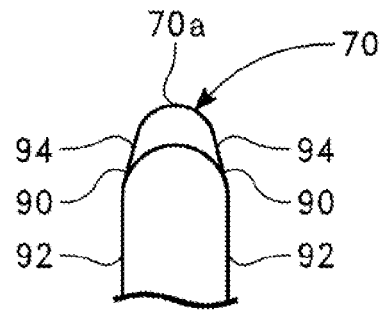
FIG. 4 is an end view corresponding to FIG. 3 of a portion including a nodule and the chamfer.

To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

DETAILED DESCRIPTION

Referring to FIGS. 1-5, a chain grab hook has a body 10 supporting a clevis 15 at one end and an arcuate hook section 20 at an opposite end. The clevis 15 may be adapted to couple to one end of a chain. The clevis 15 may include a pair of clevis legs 16-1, 16-2, with respective clevis pin holes 17-1, 17-2 and a removable pin 18 extending through the clevis pin holes 17-1, 17-2. The pin 18 may be held in place by any suitable means, such as a cotter pin 19. The arcuate hook section 20 consists of a shank 22 extending from the body 10, a curved saddle 24 extending from the shank 22 and a tip end 26. The shank 22 and the tip end 26 extend along respective axes 30, 32 generally parallel to one another and at an acute angle A with respect to an axis 34 of the clevis 15. The shank 22 has an interior surface 40 facing the tip end and extending generally parallel to the shank axis 30. The tip end 26 has an interior surface 42 facing the shank interior surface 40 and extending generally parallel to the tip end axis 32. The saddle 24 has arcuate interior surface 44 extending from respective ends of the shank and tip end interior surfaces 40, 42. The saddle interior surface 44 may have a radius of curvature R corresponding to a diameter equal to a gap G separating the shank and tip end interior surfaces 40, 42. The interior surfaces 40, 42, 44 define a throat or hook opening 50 having an opening size corresponding to the gap G. The gap G is sized so that one link 60 of a chain 62 fits within the throat 50. For example, if the chain link 60 has a thickness T, then the gap G may be larger than T by a small amount, such as about 5%, for example.

Figure 5:
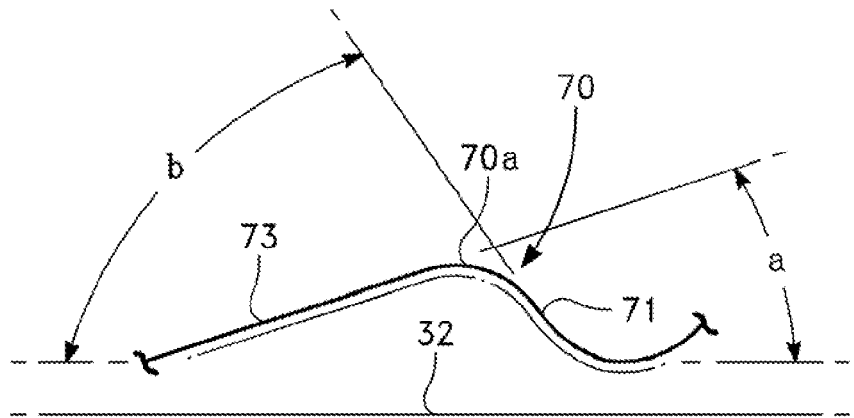
FIG. 5 is a side view of a portion of the embodiment of FIG. 1 showing the shape of the nodule.
Figure 6:
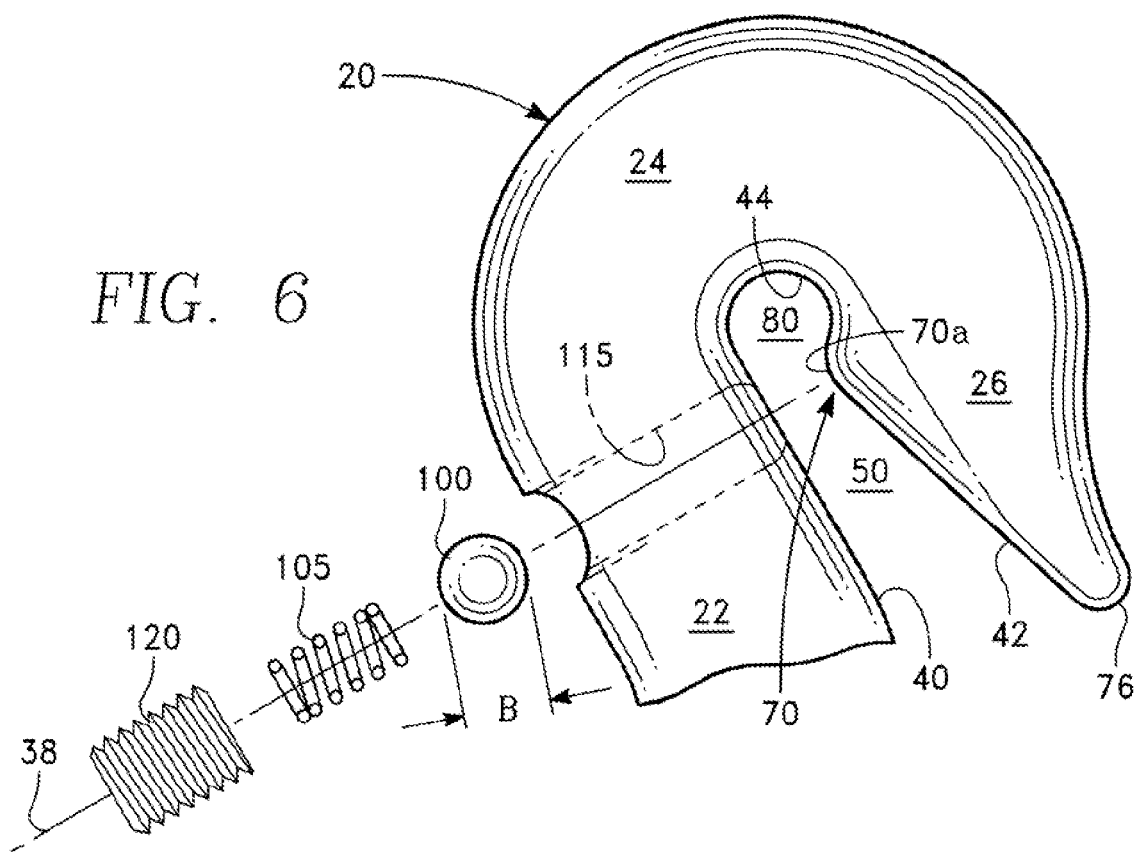
FIG. 6 is an exploded view corresponding to FIG. 1 depicting an assembly of a ball, spring and threaded plug received in a passage of the chain grab hook.

The tip end interior surface 42 supports a nodule 70 which is a smooth arcuate protrusion extending from the surface 42 toward the shank 22 and into the throat 50. The nodule 70 may be an integral portion of the tip end 26. The nodule 70 has a non-symmetrical curved shape having a sharper exit slope 71 at one end 72 facing the saddle 24 and a more shallow entrance slope 73 at the other end 74 facing tip 76 of the tip end 26. For example, as shown in FIG. 5, the entrance slope 73 may form a small acute angle, a, of 20° to 40° with the axis 32 while the exit slope 71 may form a larger acute angle, b, of 45° to 60° with the axis 32. Thus, the exit slope 71 is steeper than the entrance slope 73 by a factor of between 1.125 and 3. The sharper slope 71 facing the saddle 24 is spaced from the center of the arcuate saddle interior surface 44 by a distance "d" slightly larger than the thickness T of the chain link 60, the distance "d" being sufficient for one leg the chain link 60 to fit between the saddle 24 and the nodule 70. The height H of the nodule apex 70a above the tip end interior surface 42 is such that a snap-on gap S between the nodule apex 70a and the shank interior surface 40 is only slightly larger than the chain link thickness T, for example by only a few percent or less. Thus, some elastic deformation of the chain link 60 and (or) the interior surface 40 or nodule 70 may occur as the chain link passes the nodule 70. This feature enables the user to snap the chain link 60 past the nodule 70 toward the saddle 24, so that one leg of the link 60 rests in a generally circular engagement zone 80 defined between the saddle interior surface 44 and the nodule 70.

The nodule 70 is configured so that the force required to snap (engage) a chain link into the engagement zone 80 is less than the force required to remove (disengage) it. The advantage is that the lesser engagement force is limited to enable the user to engage a chain into the grab hook using only one hand to hold the hook. Another advantage is that the greater disengagement force prevents unwanted disengagement in instances where the tension on the chain temporarily relaxes. The engagement force is less because the gradual nodule slope 73 facing the opening of the throat 50 forms a small acute angle (as described above). The disengagement force is greater because the sharper nodule slope 71 facing the saddle 24 forms larger acute angle (as described above). The difference between the engagement and disengagement forces is a function of the ratio between the two slopes 71, 73. As described above, this ratio may lie in a range of about 1.125 to 3, for example.

A chamfer 90 joins the flat side surface 92 of the hook body 10 with the interior surfaces 40, 42, 44. The rounded sides 94 of the nodule 70 smoothly merge with the chamfer 90. The chamfer 90 allows the chain link 60, while engaged in the throat 50, to articulate within the throat 50 and thereby enable the hook to grab the chain more firmly.

Figure 7:
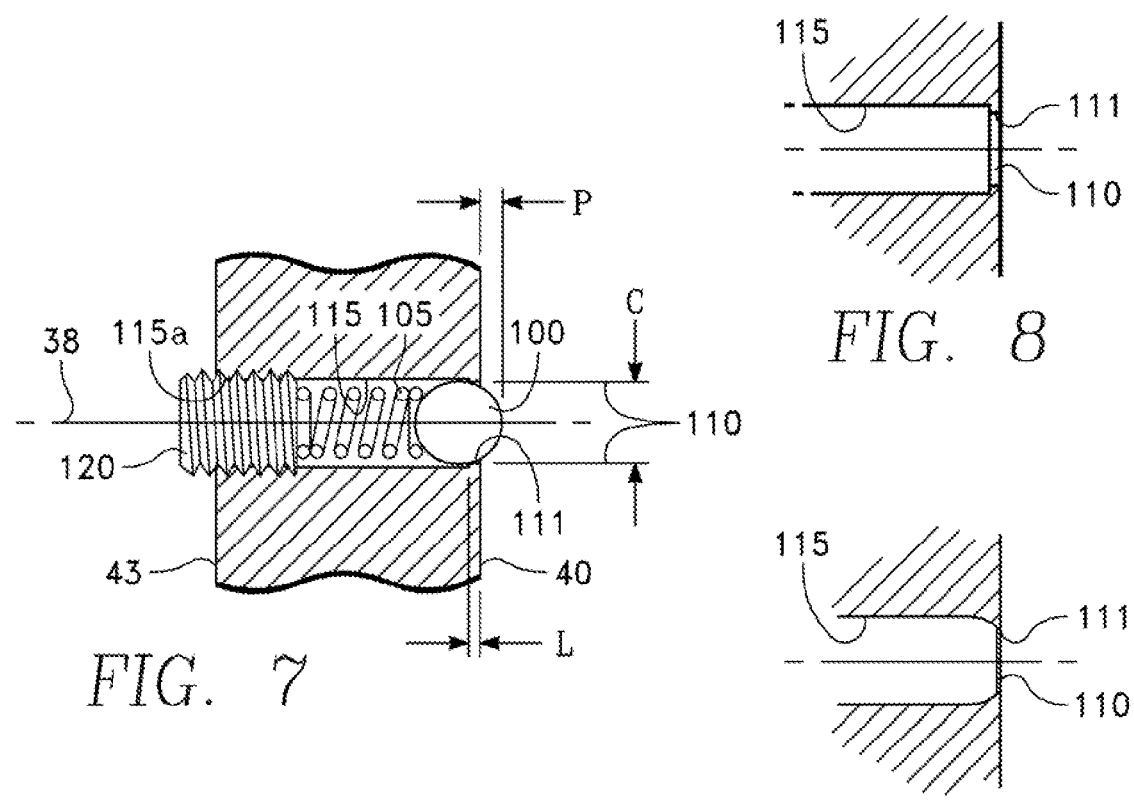
FIG. 7 is a cross-sectional view corresponding to FIG. 6 with the ball, spring and plug assembly inside the passage.
Figure 8:
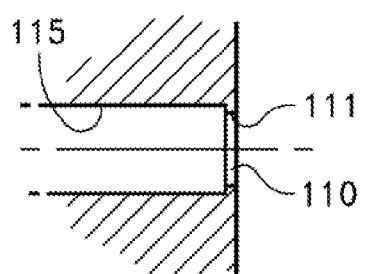
FIG. 8 is a cross-sectional view corresponding to FIG. 7 prior to insertion of the ball, spring and plug assembly into the passage.
Figure 9:
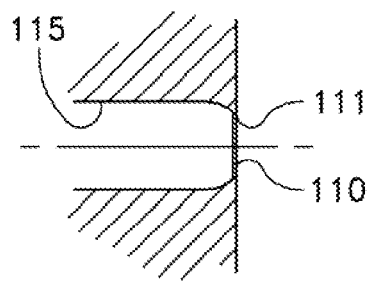
FIG. 9 is a cross-sectional view corresponding to FIG. 8 depicting a modification of the passage.

Referring now to FIGS. 6 through 9, a spring-loaded rotatable lock ball 100 protrudes from the shank interior surface 40 into the throat 50, in accordance with the following features. A large diameter hollow cylindrical passage 115 in the shank 22 forms an opening 115a in an exterior surface 43 of the shank 22. The cylindrical passage 115 is aligned with (and faces) the apex 70a of the nodule 70. The opposite end of the passage 115 terminates at a small diameter hollow cylindrical passage 110 coaxial with the passage 115 and defined by a shoulder 111 of axial length L. The small diameter passage 110 forms an opening in the shank interior surface 40. It is from this opening that the ball 100 may protrude. The ball 100 is biased by an elastically compressible member such as a spring 105 against an interior edge of the shoulder 111. The shoulder 111 may have a rectangular cross-sectional shape, as shown in FIGS. 7 and 8, or may have an arcuate shape as shown in FIG. 9. In one implementation, the arcuate shape of the shoulder 111 of FIG. 9 may conform with the diameter of the ball 100. In one embodiment, the ball 100 moves against the spring 105 along an axis 38 of the cylindrical passage 115 that intercepts the apex 70a of the nodule 70. This feature provides maximum resistance to chain disengagement by the combination of the nodule 70 and the lock ball 100.

The diameters of the lock ball 100 and of the cylindrical passage 115 are similar, with the cylindrical passage 115 being slightly larger than the ball 100 for free movement of the ball 100 along the passage 115. However, the diameter C of the opening 110 at the shank interior surface 40 is slightly less than the diameter B of the ball 100. The ratio between the diameters B and C determine the distance by which the ball 100 protrudes into the small diameter passage 110. The distance P by which the ball 100 protrudes beyond the interior shank surface 40 into the throat 50 is the distance by which the ball 100 protrudes into the small diameter opening 110 less the axial length L of the shoulder 111. In one example, the diameter C of the ball protrusion opening 110 may be about 70%-95% of the diameter B of the ball 100, and the length L of the shoulder 111 may be less than 5%-15% of the ball diameter B, so that the protrusion distance P by which the ball 100 protrudes beyond the shank interior surface 40 may be about 25%-45% of the ball diameter B.

The spring 105 is held in place by the threaded plug 120 which is threaded into the cylindrical passage 115 at the opening 115a. The lock ball 100 responds to movement of the chain link 60 through the space between the ball 100 and nodule 70 by rotating. The rotation of the ball 100 reduces friction when the chain link 60 is snapped past the nodule 70. During passage of the chain link 60 past the nodule 70 and ball 100, the ball 100 may depress completely to the plane of the shank interior surface 40 and not protrude above the surface 40, so as to offer less resistance to engagement of the chain link. The movement or depression of the ball 100 against the spring 105 during chain link engagement is free of any risk of binding. The result is a chain grab hook with which the user can engage a chain link easily with one hand, but which resists accidental disengagement of the chain link. These features significantly improve both efficiency of use and safety.

Figure 10A:
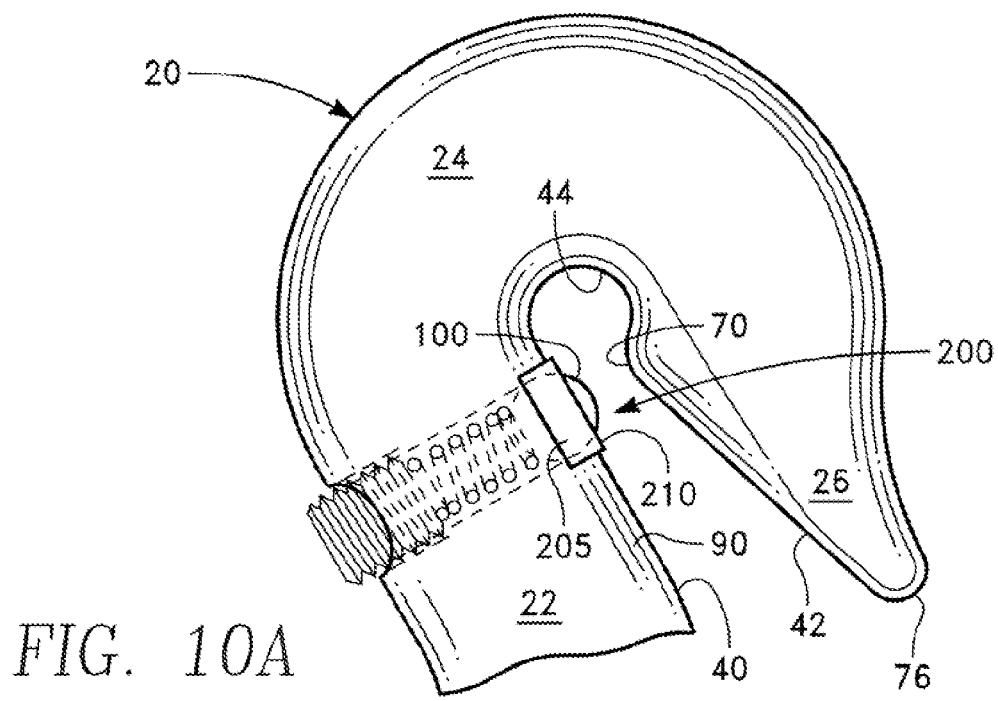
FIG. 10A is an elevational view depicting a modification of the embodiment of FIG. 1.
Figure 10B:
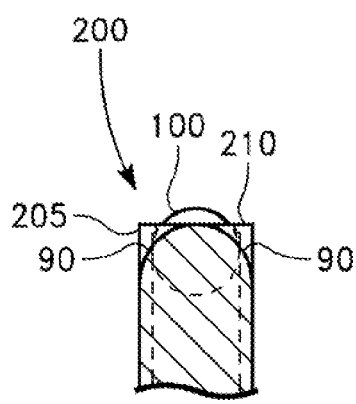
FIG. 10B is a cross-sectional end view corresponding to FIG. 10A.
Figure 10C:
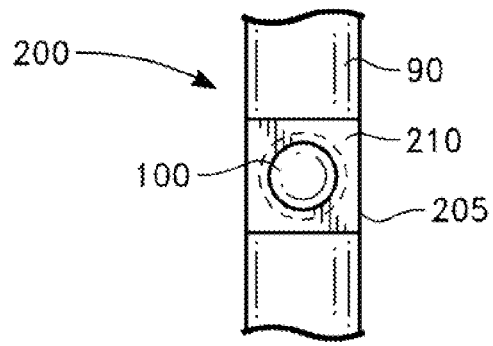
FIG. 10C is a top view corresponding to FIG. 10A.

FIGS. 10A, 10B and 10C depict a modification of the embodiment of FIG. 1, in which a rectangular table 200 surrounding the ball 100 is integrally formed with the shank 22, and provides a more uniform seating around the ball 100. The table 200 has a vertical side all 205 and a planar top surface 210, and interrupts the chamfer 90.

Figure 11:
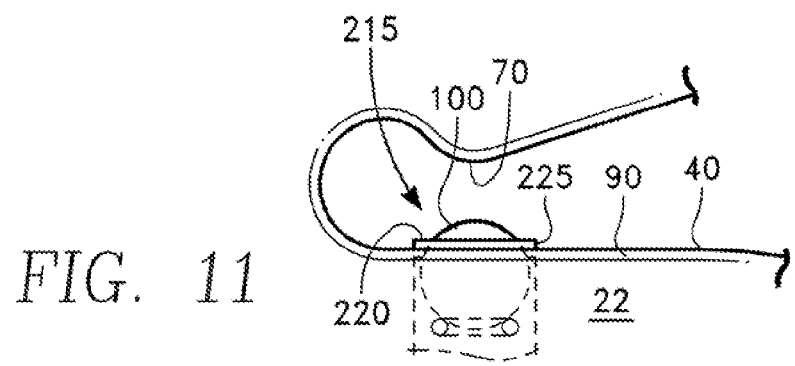
FIG. 11 is another elevational view depicting a further modification of the embodiment of FIG. 1.

FIG. 11 depicts another modification of the embodiment of FIG. 1, in which the surface of the shank 22 includes a raised shoulder 215 surrounding the ball, the shoulder 215 including a planar top surface 220 and a side wall 225. The top surface 220 of the shoulder 215 may be above the adjacent surface of chamfer 90 by a distance of at least 1% of the diameter of the ball 100.

FIGS. 12 and 13 depict a modification of the hook of FIG. 1, in which the spherical ball 100 is replaced by a planar disk 260, and the internal passage 115 is modified to have a threaded cylindrical portion 115a containing the cylindrical threaded plug 120 and spring 105 and a slotted portion 115b holding the planar disk 260. The disk 260 may protrude from both ends of the slot 115b, as depicted in FIG. 12. A floating plate 262 may be provided between the spring 105 and the disk 260. Such a floating plate may also be provided between the coil spring 105 and ball 100 in the embodiment of FIG. 1, if desired. The surface of the plate 262 facing the disk 260 may be polished to minimize resistance to rotation of the disk 260 during insertion of a chain link into the hook. The external end of the slot 115b terminates in a shoulder 115c forming a slotted opening 115d through which the disk 260 partially protrudes, the distance of this protrusion being determined by the length of the slotted opening 115d.

Optionally, the spring 105 may be replaced by a hair-pin spring 265 held within the slotted portion 115b of the passage 115. In such a case, the spring-containing portion 115a of the passage 115 may also have a slotted shape (rather than a cylindrical shape) to hold the hair-pin spring 265.

In other embodiments, the plug 120 may be held in place by means other than threads, such as an interference fit, and therefore may not be threaded. In such a case, the plug 120 and the passage 115 need not be cylindrical, but may be another shape, such as rectangular, for example.

In other embodiments, the entire passage 115 is internally threaded all the way to the ball 100 so that the threaded cylindrical plug 120 is capable of being tightened against the ball 100 to completely collapse the spring 105 against the ball 100 to lock the ball 100 in place. The ball 100 in such a case may be released by backing off the threaded plug 120 (by unscrewing the plug 120).

FIG. 14 depicts a different embodiment in which locations of the ball 100 and of the nodule 70 are exchanged with respect to the embodiment of FIG. 1, so that the nodule 70 is located at the shank 22 while the ball 100, passage 115 and plug 120 are located in the tip end 26.

While the foregoing is directed to embodiments of the present invention, other and further embodiments of the invention may be devised without departing from the basic scope thereof, and the scope thereof is determined by the claims that follow.

What is claimed is:

1. A chain grab hook, comprising:
  a hook body comprising a shank at one end of said hook body, a curved saddle having a first end extending from said shank and a tip portion extending from an opposite end of said curved saddle, said shank and said tip portion generally facing one another and defining between them a throat, one of said shank and tip portion comprising a first section and the other of said shank and tip portion comprising a second section;
  a hollow cylindrical passage within said first section and extending toward said second section, said passage comprising a large diameter portion extending through said first section from an outer surface of said first section and a small diameter portion extending from said large diameter portion to an interior surface of said first section facing said second section, and a shoulder at a boundary between said large and small diameter portions;
  a ball within said passage having a diameter that is: (a) less than a diameter of said large diameter portion of said passage and (b) greater than a diameter of said small diameter portion of said passage;
  a plug in said large diameter portion at said outer surface;
  an elastically compressible member inside said large diameter portion and compressed between said plug and said ball, to a stop position at which said ball is biased against said small diameter portion of said passage for protrusion of a portion of said ball through said small diameter portion and beyond said interior surface;

a fastening element at an opposite end of said hook body.

2. The chain grab hook of claim 1 further comprising:

an interior surface on said second section facing said interior surface of said first section;

a nodule on said interior surface of said second section portion, said nodule extending partially into, said throat and comprising:

an apex raised above said interior surface of said second section and facing said ball and being in general alignment with a longitudinal axis of said hollow cylindrical passage in said first section;

an entrance slope extending from said apex to an end of said section section and providing a smooth transition from said apex to said second section interior surface;

an exit slope extending from said apex toward said curved saddle;

said exit slope being steeper than said entrance slope by a selected factor controlling a difference between a chain engagement force and a chain disengagement force.

3. The chain grab hook of claim 2 wherein said factor is between about 1.125 and 3.

4. The chain grab hook of claim 2 further comprising a chamfer at a corner of said interior surface of said tip portion, wherein said nodule merges smoothly with said chamfer.

5. The chain grab hook of claim 2 further comprising a first section chamfer of said interior surface of said first section facing.

6. The chain grab hook of claim 5 further comprising a rectangular region in said interior surface of said interior surface of said first section, said rectangular region being adjacent said passage and constituting an interruption of said first section chamfer, said rectangular region comprising a flat surface surrounding said passage and coinciding with a top portion of said first section chamfer.

7. The chain grab hook of claim 2 further comprising a table surface on said interior surface of said first section and surrounding said passage, said table surface being raised above a top portion of said interior surface of said first section by a distance of at least 1% of the diameter of said ball.

8. The chain grab hook of claim 1 wherein said diameter of said ball exceeds said diameter of said small diameter portion in accordance with a ratio determining a distance by which said ball extends into said small diameter opening portion.

9. The chain grab hook of claim 8 further comprising a shoulder of axial length L defining said small diameter portion, wherein said stop position corresponds to a protrusion distance P of said ball beyond said interior surface equal to said distance by which said ball extends into said small diameter portion less said axial length L of said shoulder.

10. The chain grab hook of claim 1 wherein said shoulder has a rectangular cross-sectional shape.

11. The chain grab hook of claim 1 wherein said shoulder has a curved cross-sectional shape.

12. The chain grab hook of claim 6 wherein said curved cross-section shape conforms with the diameter of said ball.

13. The chain grab hook of claim 1 wherein said elastically compressible member comprises a spring.

14. The chain grab hook of claim 1 wherein said plug is threadably engaged with an interior surface of said hollow cylindrical passage.

15. The chain grab hook of claim 14 wherein said plug is threadably engaged with the interior surface of said hollow cylindrical passage so as to be seated against said ball in a fully compressed position, whereby to lock said ball.

16. The chain grab hook of claim 1 wherein said fastening element at the opposite end of said hook body comprises a clevis.

17. The chain grab hook of claim 1 wherein said ball is a flat disk, said hollow cylindrical passage comprising a slotted portion containing said disk, said disk having an axis of symmetry parallel to a direction of said throat, whereby to be rotatable during insertion of a chain link into said throat.

18. The chain grab hook of claim 17 wherein said elastically compressible member comprises a hair pin spring.

19. The chain grab hook of claim 1 wherein said elastically compressible member comprises a helical coil spring.

* * * * *